United States Patent
Miki

(10) Patent No.: US 9,708,070 B2
(45) Date of Patent: Jul. 18, 2017

(54) PARACHUTE

(71) Applicant: Yasuyuki Miki, Osaka (JP)

(72) Inventor: Yasuyuki Miki, Osaka (JP)

( * ) Notice: Subject to any disclaimer, the term of this patent is extended or adjusted under 35 U.S.C. 154(b) by 51 days.

(21) Appl. No.: 14/805,337

(22) Filed: Jul. 21, 2015

(65) Prior Publication Data

US 2016/0052635 A1 Feb. 25, 2016

(30) Foreign Application Priority Data

Aug. 20, 2014 (JP) ................................. 2014-167431

(51) Int. Cl.
*B64D 17/02* (2006.01)
*B64D 17/24* (2006.01)

(52) U.S. Cl.
CPC ............. *B64D 17/02* (2013.01); *B64D 17/24* (2013.01)

(58) Field of Classification Search
CPC ................................ B64D 17/02; B64D 17/24
USPC ........................................................ 244/142
See application file for complete search history.

(56) References Cited

U.S. PATENT DOCUMENTS

| | | | | |
|---|---|---|---|---|
| 4,078,744 A * | 3/1978 | Heinrich | ................ | B64D 17/02 244/145 |
| 4,270,714 A * | 6/1981 | Jalbert | ................ | B64D 17/02 244/145 |
| 5,037,042 A * | 8/1991 | Calianno | ................ | B64D 17/02 244/145 |
| 7,178,762 B2 * | 2/2007 | Preston | ................ | B32B 27/00 244/142 |

FOREIGN PATENT DOCUMENTS

JP            2000344199 A     12/2000

\* cited by examiner

*Primary Examiner* — Brian M O'Hara
*Assistant Examiner* — Keith L Dixon
(74) *Attorney, Agent, or Firm* — Rahman LLC

(57) ABSTRACT

A parachute includes a resistive body which is formed in a bag shape and receives air resistance, and two suspension lines, one end of each of which is connected to the resistive body and the other end of each of which can be connected to an object to be braked. The resistive body includes an opening through which air passes, a bottom part provided at an opposite side of the opening, and a side part provided extending toward a periphery of the opening from the bottom part while expanding. The side part includes a base part having an approximately constant height from the bottom part, and two tapered extension parts, each of which extends from the base part, while reducing a width thereof, to each of two ends as apexes located symmetrically with each other in the periphery of the opening.

5 Claims, 6 Drawing Sheets

PARACHUTE

CROSS REFERENCE TO RELATED APPLICATION

This application claims priority to Japanese patent application number 2014-167431, filed on Aug. 20, 2014, the contents of which, in its entirety, is herein incorporated by reference.

TECHNICAL FIELD

The present invention relates to a parachute connected to an object moving through the air or on the ground to decrease a moving speed of the object by use of air resistance.

BACKGROUND OF THE INVENTION

In order to slow a descending speed of an object descending through the air to allow a safe landing of the object on the ground, for example, a parachute as disclosed in JP 2000-344199 A is used. The parachute 100 of JP 2000-344199 A comprises, as shown in FIG. 5, a circular canopy 101 which opens by air resistance and decreases a descending speed of an object 104 by the air resistance. For equally opening the circular canopy 101, in the parachute 100, one ends of a plurality of (more than two) suspension lines 103 are connected to a circumferential upper edge 102 of the canopy 101 at approximately equal intervals, and the other ends of the plurality of suspension lines 103 are connected to the object 104.

SUMMARY OF THE INVENTION

Problem to be Solved by the Invention

As described above, the parachute 100 of JP 2000-344199 A requires an enormous number of the suspension lines 103 for equally opening the circular canopy 101. In particular, though seven suspension lines 103 are shown in FIG. 5 (see FIG. 1 of JP 2000-344199 A), at least 12 suspension lines are provided actually, including omitted suspension lines which are not shown in the drawing. Such large number of suspension lines 103 may lead to entangled suspension lines in use of the parachute 100 and then result in a problem that the canopy 101 does not open equally and the object 104 falls without decreasing the descending speed. Also, since the suspension lines are entangled to each other when folding the parachute 100 for storage, it will be required to wind off the entangled suspension lines 103 in the following use and this operation for winding off will be extremely complicated.

To solve such problem, it might be considered that for example, the number of the suspension lines 103 of the parachute 100 of JP 2000-344199 A is simply decreased to two. However, as described above, in the parachute 100, the existence of the large number of suspension lines 103 is an essential requirement for equally opening the canopy 101 and if the suspension lines are only two, it is impossible to equally open the canopy 101. Specifically, as shown in FIGS. 6A and 6B, while a force for expanding the circumferential upper edge 102 due to air resistance inside the canopy 101 acts on the canopy 101, a force for closing the circumferential upper edge 102 due to tensions of the two suspension lines 103 connected to the circumferential upper edge 102 acts only on the places where the two suspension lines 103 are connected. Therefore, the circumferential upper edge 102 reduces its diameter only in the direction connecting the two places and the circumferential upper edge 102 deforms in a figure eight shape (FIG. 6B). If the circumferential upper edge 102 opens equally as shown in FIG. 5, all of the air flowing toward the canopy 101 flows into the inside of the canopy 101 through the inside of the circumferential upper edge 102, and the outside of the canopy 101 does not receive a resistance of the air flowing toward the canopy 101. However, if the circumferential upper edge 102 deforms in a figure eight shape (shape of "8") as shown in FIG. 6B, the outside part where the circumferential upper edge 102 of the canopy 101 reduces its diameter receives a resistance of the air flowing toward the canopy 101 (right and left arrows in FIG. 6A) and due to this air resistance, the canopy 101 further receives a force in the direction of closing the circumferential upper edge 102. Consequently, the canopy 101, the opening area of which is reduced due to a further deformation of the circumferential upper edge 102, cannot receive enough air resistance and thus cannot decrease the descending speed of the object 104 sufficiently.

Further, in order to equally open the canopy 101 without entangling suspension lines 103, a method of connecting suspension lines integrated with cloth exists, such as a parachute for training, but in such method, a large amount of cloth is used and thus results in not only an increase of the weight, but also lowered storability and an increased production cost.

The present invention is made in consideration of such problems and a problem to be solved by the invention is to provide a parachute which can receive enough resistance even if only two suspension lines are provided.

Means to Solve the Problem

A parachute according to an embodiment of the invention comprises a resistive body which is formed in a bag shape and receives air resistance; and two suspension lines, one end of each of the two suspension lines being connected to the resistive body, the other end thereof being connectable to an object to be braked, wherein the resistive body comprises: an opening through which air passes; a bottom part provided at an opposite side of the opening; and a side part provided extending toward a periphery of the opening from the bottom part while expanding, wherein the side part comprises: a base part having an approximately constant height from the bottom part over the whole base part; and two tapered extension parts, each of which extends from the base part, while reducing a width thereof, to each of two ends as apexes located symmetrically with each other in the periphery of the opening with respect to a center of the opening, wherein one end of each of the two suspension lines is connected to each of the two ends of the two extension parts.

Effects of the Invention

According to the invention, it is possible to provide a parachute which can receive enough resistance even if only two suspension lines are provided.

DETAILED DESCRIPTION

In the following, the parachute according to an embodiment of the present invention will be explained in reference to the attached drawings.

The parachute according to an embodiment of the present invention is connected to an object moving through the air or on the ground to decrease a moving speed of the object by use of air resistance. Any object may be used as an object to which the parachute of the embodiment is applied and which is to be braked, as long as the object is an object moving through the air or on the ground, for example, a person or a material descending through the air from a flying plane or the like; a racing car running on the ground; a plane after landing; and a runner during a running training. In the following, the parachute of the embodiment will be explained based on an example where the parachute is applied to an object descending through the air.

Figure 1:
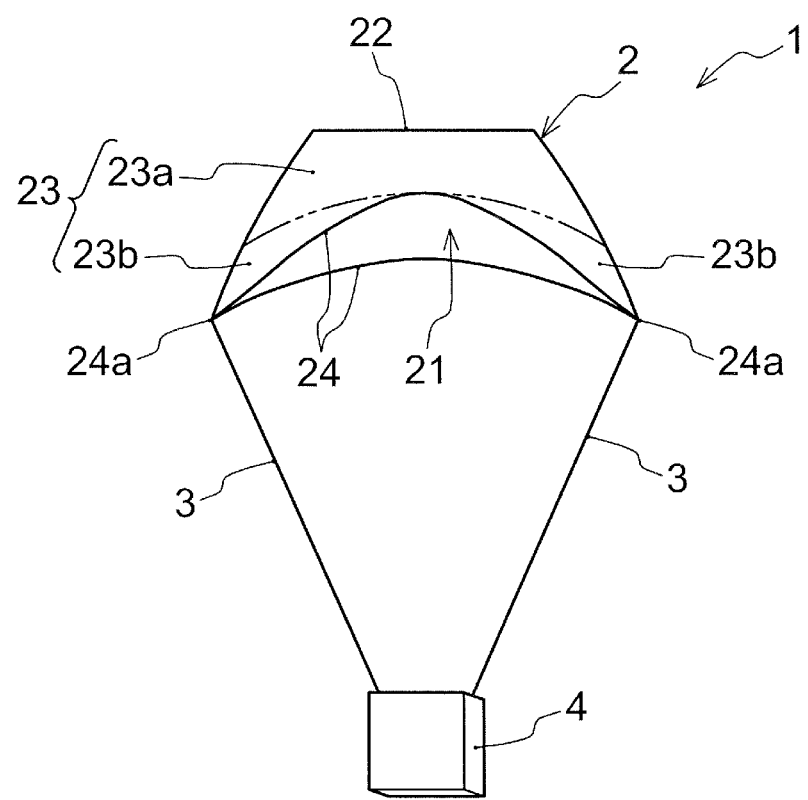
FIG. 1 is a schematic perspective view showing a state where a parachute according to an embodiment of the present invention is connected to an object to be braked.

The parachute 1 comprises, as shown in FIG. 1, a resistive body 2 which is formed in a bag shape and receives air resistance in the air and two suspension lines 3, one end of each of which is connected to the resistive body 2 and the other end of each of which can be connected to an object 4 as an object to be braked. The suspension lines 3 consist of only two suspension lines, and do not have further suspension lines. The parachute 1 is configured such that air resistance, which the resistive body 2 opening in the air receives, resists a tensile stress, which the resistive body 2 receives from the object 4 under the force of gravity via the two suspension lines 3, and thereby decrease a descending (moving) speed of the object 4 that descends (moves) through the air.

The bag-shaped resistive body 2 comprises, as shown in FIG. 1, an opening 21 through which the air passes, a bottom part 22 provided at an opposite side of the opening 21, and a side part 23 provided extending from the bottom part 22 to a periphery 24 of the opening 21 while expanding.

The opening 21 is, as shown in FIG. 1, provided at the side of the object 4 in the resistive body 2 and is opened toward the side of the object 4. The air flows into the inside of the resistive body 2 by passing through the opening 21 and flows out to the outside of the resistive body 2 by passing though the opening 21.

Figure 3A:
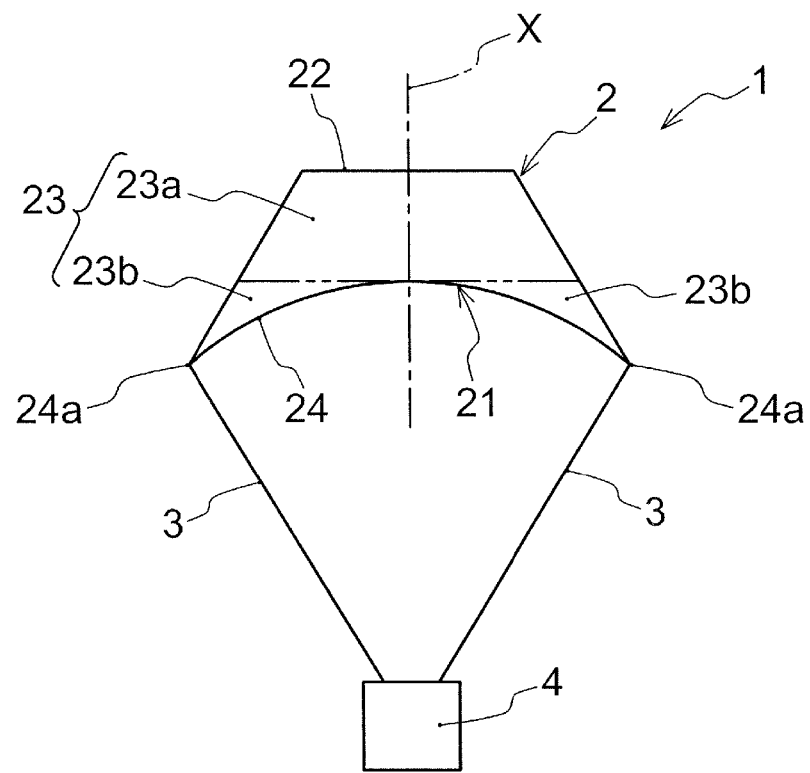
FIG. 3A is a schematic front view of a parachute according to an embodiment of the present invention showing the state where an opening of a resistive body is opened.

The bottom part 22 is, as shown in FIGS. 1 and 3A, provided at the opposite side of the opening 21 and is a part located at the bottom of the bag-shaped resistive body 2. The bottom part 22 is arranged such that a tangent line of the bottom part 22 is approximately perpendicular to a center axis X of the opening 21. More specifically, the bottom part 22 is formed in a linear shape and is arranged along a direction approximately perpendicular to the center axis X of the opening 21. The bottom part 22 receives mainly a resisting force Dx of the air in a direction parallel to the center axis X of the opening 21 (see FIG. 4A). Although the bottom part 22 is shown as a linear portion extending approximately perpendicular to the center axis X in this embodiment, the shape of the bottom part 22 is not limited to the linear shape as long as the bottom part 22 is provided at the opposite side of the opening 21 and located at the bottom of the resistive body 2, and other shapes such as a dot shape or a planer shape may be also adopted as the shape of the bottom part 22.

Figure 2A:
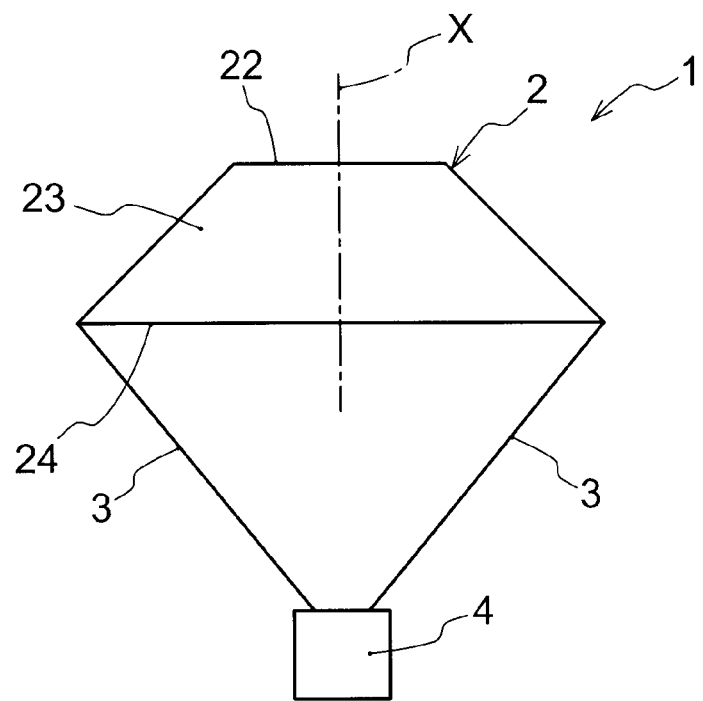
FIG. 2A is a schematic front view of a parachute according to an embodiment of the present invention showing the state where an opening of a resistive body is closed.
Figure 4A:
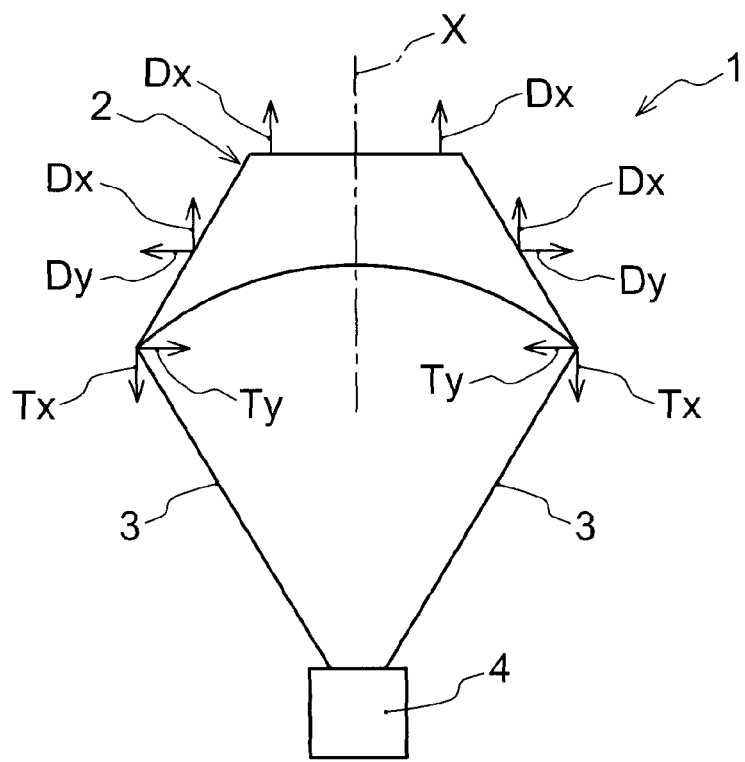
FIG. 4A is a front view of a parachute according to an embodiment of the present invention schematically showing a force that a resistive body receives in the state where an opening of the resistive body is opened.
Figure 4B:
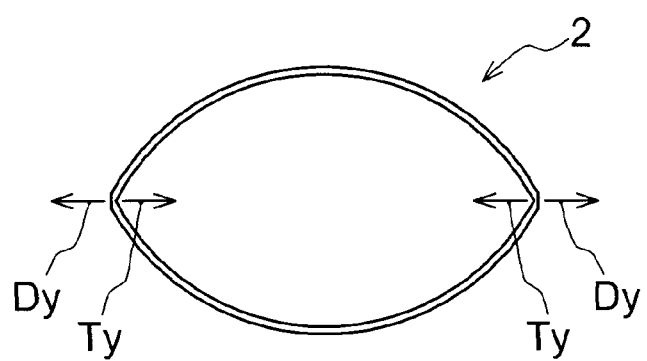
FIG. 4B is a view from the lower side of FIG. 4A of a resistive body of a parachute according to an embodiment of the present invention schematically showing a force that the resistive body receives in the state where an opening of the resistive body is opened.
Figure 5:
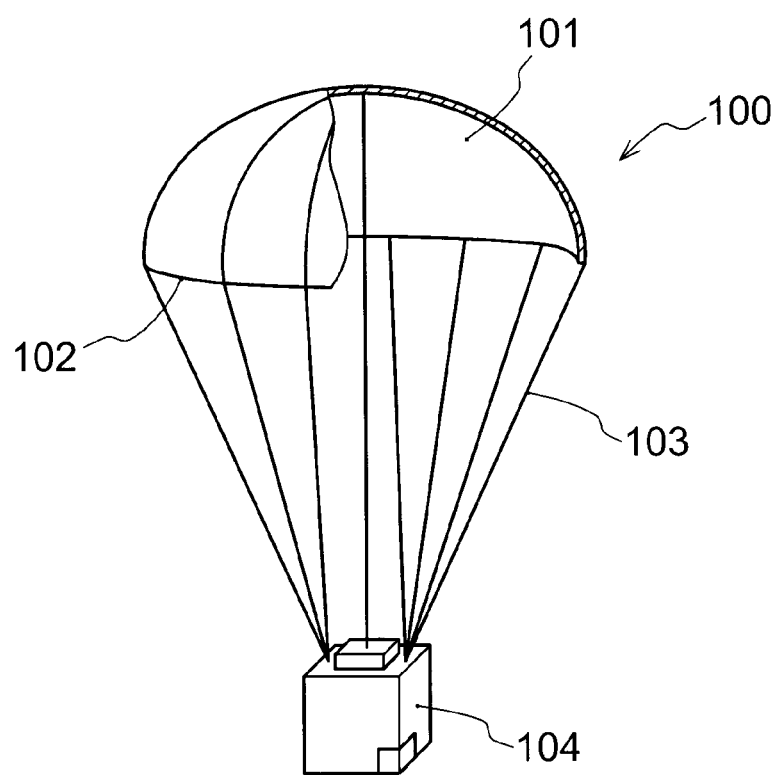
FIG. 5 is a schematic view showing the state where a conventional parachute is connected to an object.

The side part 23, as shown in FIG. 1, extends from the bottom part 22 to the periphery 24 of the opening 21 while expanding, and as shown in FIGS. 2A and 3A, is provided at an angle to the center axis X of the opening 21. The side part 23, which is provided at an angle to the center axis X, receives, as shown in FIG. 4A, resisting forces Dx and Dy of the air divided into a direction parallel to the center axis X and a direction perpendicular to the center axis X, respectively. The resisting force Dx in the direction parallel to the center axis X that the side part 23 receives, together with the resisting force Dx that the bottom part 22 receives, resists a component force Tx in the direction parallel to the center axis X in the tensile stress from the object 4 via the suspension lines 3. On the other hand, the resisting force Dy in the direction perpendicular to the center axis X that the side part 23 receives allows the opening 21 to open and resists a component force Ty in the direction perpendicular to the center axis X in the tensile stress from the object 4 via the suspension lines 3.

As shown in FIGS. 1 and 3A, the side part 23 comprises, in the state where the opening 21 is opened, a base part 23a having an approximately constant height from the bottom part 22 over the whole base part 23a in the direction parallel to the center axis X, and two tapered extension parts 23b, 23b, each of which extends from the base part 23a, while reducing a width thereof, to each of two ends 24a, 24a as apexes located symmetrically with each other in the periphery 24 of the opening 21 with respect to the center of the opening 21. More specifically, the base part 23a consists of two parts (a right-hand part and a left-hand part in FIG. 3A) which are symmetrical to each other about the center axis X of the opening 21, and each of the two extension parts 23b, 23b extends, while reducing its width, from the whole bottom edge of each of the two parts of the base part 23a, to each of the two ends 24a, 24a as apexes located symmetrically with each other in the periphery 24 of the opening 21 with respect to the center axis X of the opening 21. In this embodiment, the two ends 24a, 24a of the two extension parts 23b, 23b are arranged such that a direction connecting the two ends 24a, 24a is approximately parallel to an extending direction of the bottom part 22 which is formed in a linear shape. It is noted that in FIGS. 1 and 3A, a boundary between the base part 23a and the extension parts 23b, 23b is shown by a two-dot chain line for illustrative purpose. The side part 23 receives stronger air resistance in an inner circumference area of the side part 23 where the extension parts 23b, 23b are provided than in an inner circumference area of the side part 23 where the extension parts 23b, 23b are not provided, in the whole inner circumference of the side part 23, since the inner circumference area of the side part 23 where the extension parts 23b, 23b are provided is larger than the inner circumference area of the side part 23 where the extension parts 23b, 23b are not provided, by the area of the extension parts 23b, 23b. As will be explained in detail in the following, the connection of two suspension lines 3 to the circumference area which receives stronger air resistance allows the resistive body 2 to receive enough air resistance to decrease the descending speed of the object 4. While the side part 23 is configured to comprise the extension parts 23b, 23b only in the state where the opening 21 is opened in this embodiment, the side part 23 may be configured to comprise the extension parts 23b, 23b also in the state where the opening 21 is closed as long as the side part 23 comprises the extension parts 23b, 23b in the state where the opening 21 is opened.

Figure 2B:
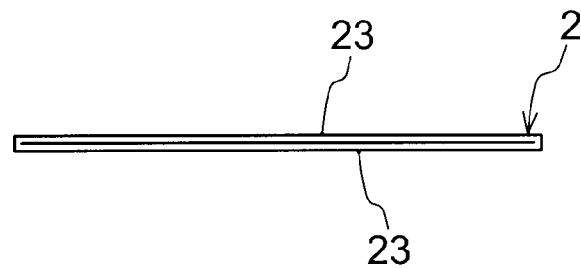
FIG. 2B is a schematic view from the lower side of FIG. 2A of a resistive body of a parachute according to an embodiment of the present invention showing the state where an opening of the resistive body is closed.
Figure 3B:
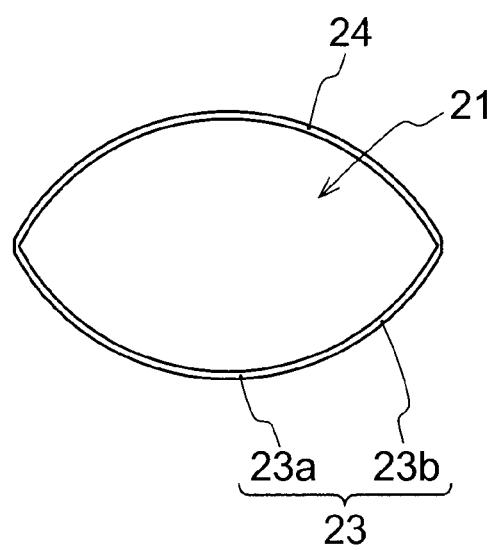
FIG. 3B is a schematic view from the lower side of FIG. 3A of a resistive body of a parachute according to an embodiment of the present invention showing the state where an opening of the resistive body is opened.

In order to form the above-mentioned side part 23, as shown in FIGS. 2A and 2B, the resistive body 2 is made of two planner clothes or sheets joined to each other at the periphery parts except for the part corresponding to the periphery 24 of the opening 21. In this embodiment, two clothes or sheets in an approximate trapezoid shape are joined to each other to form the resistive body 2 which has an approximate trapezoid shape in a front view where the opening 21 is closed. Here, as long as the resistive body 2 is configured to comprise the extension parts 23b, 23b in the state where the opening 21 is opened, the shape in a front view where the opening 21 is closed is not limited particularly and the resistive body 2 may be formed in other shapes such as an approximate triangular shape or an approximate semicircular shape in the front view. It should be noted, however, that since the resistive body 2, which is formed in an approximate trapezoid shape in the front view, has a larger deep area in the base part 23a, compared to the resistive body, which is formed in other shapes such as an approximate triangular shape or an approximate semicircular shape which has the same height as that of the approximate trapezoid shape in the direction parallel to the center axis X in the front view, the resistive body 2 receives stronger force as a whole in its expanding direction and the larger deep area prevents an oscillation of the resistive body 2 in the vertical and horizontal directions in FIG. 3B. It is noted that the above mentioned front view refers to a state of the resistive body 2 seen along a direction perpendicular to both the center axis X of the opening 21 and a straight line connecting two ends 24a, 24a of the two extension parts 23b, 23b.

Any size and material may be adopted for the resistive body 2 as long as the resistive body 2 can receive air resistance to decrease the descending speed of the object 4, and the size and the material are not limited particularly. The size of the resistive body 2, for example, can be set according to a resistive force necessary for the size or weight of the object 4 descending through the air. In addition, a known synthetic resin such as polyvinyl chloride may be adopted for the material of the resistive body 2. Also, a production method of the resistive body 2 is not limited to the above method as long as the above mentioned configuration of the resistive body 2 can be obtained, and other methods, such as a method of making the resistive body 2 of one cloth or sheet or a method of making the resistive body 2 of a curved nonplanar cloth or sheet, may be adopted.

Figure 6A:
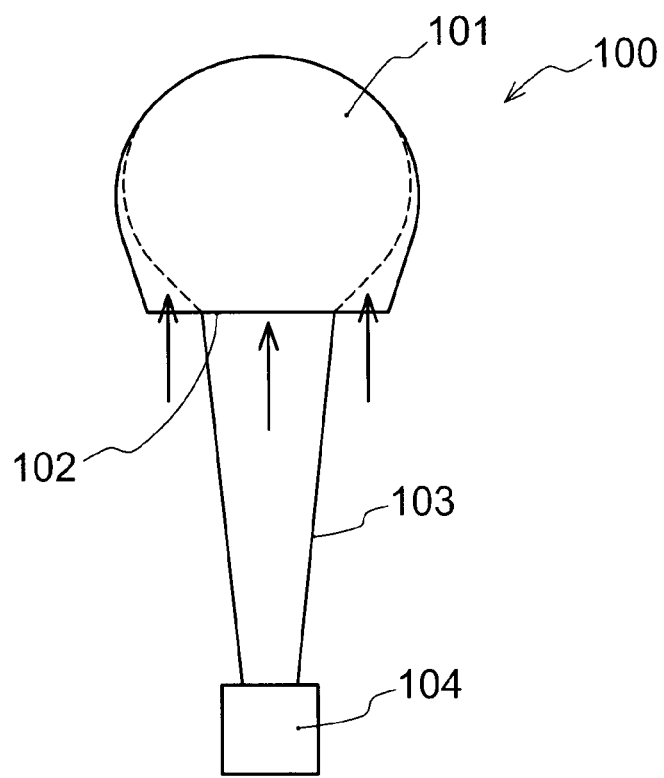
FIG. 6A is a schematic front view of a canopy showing the state where two suspension lines are assumed to be connected to a canopy of a conventional parachute to be used.
Figure 6B:
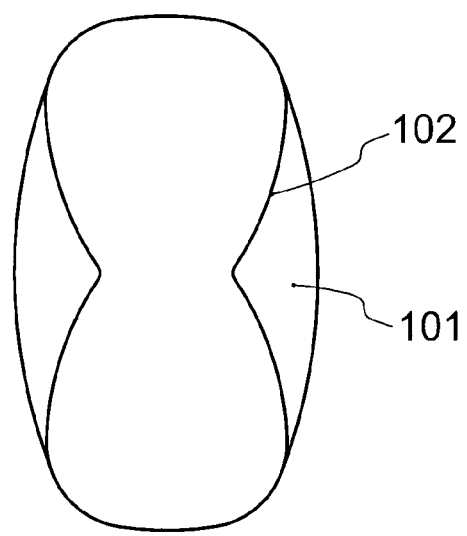
FIG. 6B is a schematic view from the lower side of FIG. 6A of a canopy showing the state where two suspension lines are assumed to be connected to a canopy of a conventional parachute to be used.

As shown in FIGS. 1 and 3A, one end of each of the two suspension lines 3 is connected to each of two ends 24a, 24a of the two extension parts 23b, 23b, and the other end of each of the two suspension lines 3 is connected to the object 4. Therefore, the suspension lines 3 transmit a tensile stress due to the force of gravity that the object 4 receives to the resistive body 2. The two suspension lines 3 are, as shown in FIG. 4A, connected to the resistive body 2 so as to create a component force Tx toward the side of the object 4 parallel to the center axis X and a component force Ty toward the inside of the resistive body 2 perpendicular to the center axis X from the transmitted tensile stress. Since one end of each of the two suspension lines 3 is connected to each of the two ends 24a, 24a of the two extension parts 23b, 23b, in the whole circumference area of the side part 23, the circumference area where the extension parts 23b, 23b are provided receives the tensile stress by the object 4 in concentrated manner. On the other hand, in the whole circumference area of the side part 23, the circumference area where the extension parts 23b, 23b are provided receives stronger air resistance than the other circumference area, as described above. Therefore, in the circumference area where the extension parts 23b, 23b are provided, stronger air resistance can resist the concentrated tensile stress of the object 4. In particular, since the resisting force Dy of the air in the direction perpendicular to the direction of the center axis X resists against the component force Ty in the direction perpendicular to the center axis X among the tensile stress received via the two suspension lines 3, the opening 21 can maintain the opening without getting distorted. Accordingly, since the opening 21 does not get distorted unlike the case where the two suspension lines 103 are connected to the above mentioned conventional canopy 101 (see FIGS. 6A and 6B), the resistive body 2 can receive enough air resistance to decrease the descending speed of the object 4.

Although one end of each of the two suspension lines 3 is directly connected to the resistive body 2 in this embodiment, a connection method is not limited particularly as long as the one end is connected to the resistive body 2. For instance, the one ends may be indirectly connected to the resistive body 2 via other auxiliary lines. Further, though the other end of each of the two suspension lines 3 is directly connected to the object 4 in this embodiment, a connection method is not limited particularly as long as the other end is connected to the object 4. For instance, the other ends of the two suspension lines 3 may be collectively connected to one suspension line or the like which functions as a cushion. In addition, any suspension line may be adopted for the parachute 1 as long as the suspension line is strong enough not to be damaged by air resistance and a tensile stress due to the object 4 that the resistive body 2 receives, and a known rope made from a synthetic resin such as a polyester resin or a polyethylene resin may be used. Moreover, the length or thickness of the suspension line is not limited particularly and may be set according to the resistive body 2 connected to the suspension lines 3 and the object 4 to which the parachute 1 is applied.

| Explanation of Symbols | |
|---|---|
| 1 | parachute |
| 2 | resistive body |
| 21 | opening |
| 22 | bottom part |
| 23 | side part |
| 23a | base part |
| 23b | extension part |
| 24 | periphery |
| 24a | end |
| 3 | suspension line |
| 4 | object (object to be braked) |
| Dx | air resistance in direction parallel to center axis |
| Dy | air resistance in direction perpendicular to center axis |
| Tx | tensile stress in direction parallel to center axis |
| Ty | tensile stress in direction perpendicular to center axis |
| X | center axis |

What is claimed is:

1. A parachute comprising:
   a resistive body formed in a bag shape and receiving air resistance; and
   exactly two suspension lines, one end of each of said two suspension lines being connected to said resistive body, the other end thereof being connectable to an object to be braked,
   wherein said resistive body comprises:
   an opening through which air passes;
   a bottom part provided at an opposite side of the opening; and
   a side part extending toward a periphery of said opening from said bottom part while expanding, wherein said side part comprises:
   a base part having an approximately constant height from said bottom part over an entirety of said base part; and
   exactly two tapered extension parts, each of which extends from said base part, while reducing a width thereof, to each of two ends as apexes located symmetrically with each other in said periphery of said opening with respect to a center of said opening,
   wherein one end of each of said two suspension lines is connected to each of said two ends of said exactly two tapered extension parts.

2. The parachute according to claim 1, wherein said base part comprises two parts which are symmetrical to each other about a center axis of said opening, and each of said exactly two tapered extension parts extends, while reducing a width thereof, from an entirety of a bottom edge of each of said two parts of said base part, to each of said two ends as apexes located symmetrically with each other in said periphery of said opening with respect to said center axis of said opening.

3. The parachute according to claim 1, wherein said bottom part is formed in a linear shape and is arranged along a direction approximately perpendicular to a center axis of said opening.

4. The parachute according to claim 1, wherein said two ends of said exactly two tapered extension parts are arranged such that a direction connecting said two ends is approximately parallel to an extending direction of said bottom part which is formed in a linear shape.

5. The parachute according to claim 1, wherein said resistive body comprises a trapezoid shape in a front view of said resistive body in a state where said opening is closed.

* * * * *